UNITED STATES PATENT OFFICE.

CHARLES F. MAROHN, OF MILWAUKEE, WISCONSIN.

COMPOSITION FOR REMOVING VARNISH, PAINT, AND THE LIKE.

1,035,620.  Specification of Letters Patent.  Patented Aug. 13, 1912.

No Drawing.  Application filed October 14, 1911. Serial No. 654,622.

*To all whom it may concern:*

Be it known that I, CHARLES F. MAROHN, a citizen of the United States, residing at Milwaukee, in the county of Milwaukee and State of Wisconsin, have invented new and useful Improvements in Compositions for Removing Varnish, Paint, and the Like, of which the following is a specification.

My present invention pertains to varnish and paint removers; and its novelty, utility and practical advantages will be fully understood from the following description and the appended claims.

In carrying out my invention, I produce what I will hereinafter denominate "methyl acetone solution of straw." The said solution is made by boiling approximately 5 parts, by weight, of straw in approximately 15 parts, by weight, of methyl acetone. For the sake of economy the boiling is preferably effected in a suitably closed tank that is equipped with a water-cooled or other suitable condenser, this in order that the evaporated acetone may be regained and afterward put back in the boiling solution. Incidental to the boiling referred to the methyl acetone serves to dissolve a portion of straw and to extract the organic matter from the straw; the said organic matter being designed to serve the important purpose of a deflocculator with respect to the powdered soapstone that is incorporated in the composition as hereinafter described. In other words the organic matter extracted from the straw is adapted to carry and maintain the powdered soapstone in suspension, so that vigorous shaking of the composition before using is not necessary.

The methyl acetone solution of straw is combined with the other ingredients of my novel varnish and paint remover as follows:

Methyl acetone solution
  of straw _____ 16 parts, by weight.
Powdered soapstone ___ 4 parts, by weight.
Oxalic acid solution___ 8 parts, by weight.
Sulfuric ether_____ 2 parts, by weight.
Deodorized naphtha ___ 2 parts, by weight.
Boiled linseed oil (commercially known as lithographic varnish No. 5)_____ 2 parts, by weight.

The oxalic acid solution incorporated in the composition is preferably produced by dissolving 2 parts, by weight, of oxalic acid in 6 parts, by weight, of methyl acetone or wood alcohol. I prefer to dissolve the oxalic acid in methyl acetone, as stated, since by so doing I produce a better solvent for varnish than any other solvent for oxalic acid. The oxalic acid may, however, be dissolved in wood alcohol or any other suitable solvent, without departure from the scope of my invention.

In preparing the composition the methyl acetone solution of straw is thoroughly mixed with the powdered soapstone until a creamy mixture is produced. Then while this mixture is being agitated the oxalic acid solution, the sulfuric ether, the deodorized naphtha and the linseed oil are added to the mixture in the proportions stated. The whole mass is then agitated for about 15 minutes, when it will be reduced to a light creamy solution adapted to be immediately applied to the varnish or paint to be removed.

The methyl acetone in combination with the oxalic acid solution, ether and naphtha mentioned, constitutes a highly efficient means for quickly and thoroughly removing varnish or paint, while the methyl acetone solution of straw described forms a gelatinous body, of about the consistency of cream, calculated to prevent evaporation of the volatile constituents to a degree, and at the same time serve as a carrier and deflocculator of the powdered soapstone. The boiled linseed oil or lithographic varnish renders the solution sufficiently heavy to prevent it running down a vertical surface when applied thereto. The powdered soapstone commingled with the other ingredients specified retains its original character and serves not only as a retarder of evaporation, but also and most important as an after cleaner in the following manner, viz: when the liquid finally evaporates the dissolved varnish adheres to the deposited powdered soapstone. The latter renders the dissolved varnish less sticky, and therefore when the dissolved varnish mass is wiped away the powdered soapstone acts as a scrubbing or abrading medium and leaves a clean surface.

In the practical use of the remover it can be applied through the medium of a brush, cotton waste or rags, and can be removed expeditiously and thoroughly through the medium of excelsior, cotton waste or a rag; after the lapse of sufficient time to enable the described constituents to thoroughly penetrate the varnish or paint to be removed.

Incidental to the described removal of the composition, the powdered soapstone serves as an after cleaner and by so doing obviates the necessity of cleaning the surface from which the varnish or paint has been removed with benzin, and the danger of fire attendant thereon. I would also have it understood that when varnish or paint is removed through the medium of my novel composition, the surface can immediately be revarnished or recoated with paint, which is obviously an important advantage.

Another advantage that may be ascribed to my novel composition lies in the fact that it will not affect the eyes, throat or hands of the user even when employed in a closed room.

Having described my invention, what I claim and desire to secure by Letters-Patent, is:

1. The composition for removing varnish, paint and the like, comprising methyl acetone solution of straw, powdered soapstone, oxalic acid solution, sulfuric ether, deodorized naphtha and boiled linseed oil.

2. The composition for removing varnish, paint and the like, comprising methyl acetone solution of straw, comminuted abrasive substance held in suspension in said solution, and adapted to serve as an after cleaner, means for dissolving the varnish, paint or the like that is to be removed, and suitable stiffening material.

3. The composition for removing varnish, paint and the like, comprising methyl acetone solution of straw, comminuted abrasive substance held in suspension in said solution, and adapted to serve as an after cleaner, and means for penetrating and dissolving the varnish, paint or the like that is to be removed.

4. The composition for removing varnish, paint and the like, comprising methyl acetone solution of straw, oxalic acid solution, sulfuric ether, deodorized naphtha, and a stiffening material.

5. The composition for removing varnish, paint and the like, comprising methyl acetone solution of straw, oxalic acid solution, sulfuric ether and naphtha.

6. The composition for removing varnish, paint and the like, comprising methyl acetone solution of straw, comminuted abrasive substance held in suspension in said solution, and adapted to serve as an after cleaner, oxalic acid solution, sulfuric ether and naphtha.

7. The composition for removing varnish, paint and the like, comprising methyl acetone solution of straw, comminuted abrasive substance held in suspension in said solution, and adapted to serve as an after cleaner, and ingredients adapted to coöperate with the methyl acetone in penetrating and dissolving the varnish, paint or the like that is to be removed.

8. The composition for removing varnish, paint and the like, comprising methyl acetone solution of straw, and ingredients adapted to coöperate with the methyl acetone in penetrating and dissolving the varnish, paint or the like that is to be removed.

9. The composition for removing varnish, paint and the like, comprising a gelatinous solution, comminuted abrasive substance held in suspension in said solution, and adapted to serve as an after cleaner, oxalic acid solution, sulfuric ether and naphtha.

10. The composition for removing varnish, paint and the like, comprising a gelatinous solution, oxalic acid solution, sulfuric ether and naphtha.

In testimony whereof I have hereunto set my hand in presence of two subscribing witnesses.

CHARLES F. MAROHN.

Witnesses:
EDNA JAMES SHEEHY,
N. C. HEALY.